United States Patent [19]
Hayashi

[11] Patent Number: 6,019,230
[45] Date of Patent: Feb. 1, 2000

[54] RECORD MEDIUM CARTRIDGE STORING BOX

[75] Inventor: Akio Hayashi, Tsukui-machi, Japan

[73] Assignee: Asaca Corporation, Tokyo, Japan

[21] Appl. No.: 09/024,583

[22] Filed: Feb. 18, 1998

[51] Int. Cl.[7] ................................................. A47B 81/06
[52] U.S. Cl. .................................. 211/41.12; 206/387.14; 206/387.15; 312/9.63
[58] Field of Search ................................ 312/9.48, 9.53, 312/9.54, 9.57, 9.63, 9.47, 9.64, 319.1; 206/387.14, 387.15, 308.1, 308.3; 211/41.12, 40; 360/133, 92; 369/34, 36, 38, 178, 75.1, 192

[56] References Cited

U.S. PATENT DOCUMENTS

| | | | |
|---|---|---|---|
| 3,860,248 | 1/1975 | Hunt et al. | 206/308.3 |
| 3,926,310 | 12/1975 | Ackeret | 312/9.57 X |
| 4,850,485 | 7/1989 | Ishikawa | 206/387.15 X |
| 4,900,107 | 2/1990 | Long et al. | 211/41.12 X |
| 5,532,888 | 7/1996 | Acosta et al. | 206/387.15 X |
| 5,540,328 | 7/1996 | Kohtake | 206/308.3 X |

Primary Examiner—Janet M. Wilkens
Attorney, Agent, or Firm—Varndell & Varndell, PLLC

[57] ABSTRACT

A record medium cartridge storing box for use in an automatic cartridge exchanging apparatus having a plurality of compartments arranged one on the other, each of which is formed by first and second side plates, rear plates and right and left supporting side flanges, and a plurality of hook spring units. Each of the hook springs units connected to the first side plate in respective compartments by a hinge portion. The hook springs units includes a forward arm, a first projection formed at a front end portion of the forward arm, a backward projection formed at a backward end portion of said second arm. When a 3480 tape cartridge has been fully inserted into a compartment, the first projection is engaged with a retaining step formed in a side wall of the cartridge and the second projection is urged against the side wall of the cartridge. When a DLT cartridge has been fully inserted into a compartment, the first projection is urged against a side wall of the cartridge and the second projection is engaged with a retaining step formed in the side wall of the cartridge. Since the first and second projections are formed to have a round outer configuration, the cartridge retained in the compartment can be easily removed therefrom.

7 Claims, 6 Drawing Sheets

RECORD MEDIUM CARTRIDGE STORING BOX

BACKGROUND OF THE INVENTION

1. Field of the Invention

The present invention relates to a record medium cartridge storing box for storing a number of record medium cartridges in a removable manner. Particularly, the present invention relates to a record medium cartridge storing box having a shape and configuration especially adapted for use in an automatic cartridge exchanging apparatus.

2. Related Art Statement

A known automatic cartridge exchanging apparatus includes a cartridge storing means for storing a number of record medium cartridges, a recording and reproducing means for recording and reproducing information on and from the record medium cartridges, a cartridge transporting means for transporting the record medium cartridges between the cartridge storing means and the recording and reproducing means, and a controlling means for controlling said cartridge storing means, recording and reproducing means and cartridge transporting means. Said cartridge storing means includes a plurality of cartridge storing boxes each storing a number of cartridges. Such automatic cartridge exchanging apparatus has been widely used in large scale computer systems or broadcasting systems, in which an extremely large number of record medium cartridges are treated.

Usually, the cartridge storing boxes provided in the cartridge storing means are arranged around a rotating member such that respective record medium cartridges can be easily and speedily indexed into a position for transferring a cartridge between the cartridge storing means and the cartridge transporting means. Therefore, during the rotation of the rotating member, all cartridges are subjected to a centrifugal force and are liable to be removed from the cartridge storing boxes. In order to prevent the cartridges from being accidentally removed out of the cartridge storing box, a cartridge retaining means is provided in each of cartridge storing compartments which are formed in the box one on the other. Said cartridge retaining means comprises a resilient member which is resiliently urged against a cartridge stored in a cartridge storing compartment. Therefore, the cartridge stored in the cartridge storing compartment has to be transferred into a hand over means of the transferring means against the resilient force of the resilient member.

Mainly due to the presence of the above mentioned cartridge retaining means, in the known automatic cartridge exchanging apparatus, only one kind of record medium cartridge can be treated. Therefore, when it is required to treat two kinds of record medium cartridges having different sizes, e.g. 3480 tape cartridge and DLT tape cartridge, it is necessary to provide two automatic cartridge exchanging apparatuses, one for cartridges having one size and the other for cartridges having the other size. This is apparently disadvantageous in view points of cost and space.

In order to mitigate the above mentioned drawback, two cartridge storing means may be provided in a single automatic cartridge exchanging apparatus, or a single cartridge storing means may be divided into two sections, one for one kind of cartridges and the other for the other kind of cartridges. However, in the former case, it is practically difficult to arrange two cartridge storing means in a limited space of the single automatic cartridge exchanging apparatus. In a latter case, the numbers of record medium cartridges of respective sizes which can be stored in respective sections of the cartridge storing means are decreased. For instance, when the cartridge storing means is divided into two halves having the same capacity, the number of cartridges which can be stored in respective sections is reduced by two. Furthermore, when a division ratio is once determined, it could not be easily changed. This does not meet a user's requirements.

SUMMARY OF THE INVENTION

The present invention has for its object to provide a novel and useful record medium cartridge storing box, in which record medium cartridges having different sizes can be stored in an easily removable manner in a single cartridge storing compartment.

According to the invention, in order to attain the above object, a record medium cartridge storing box comprises:

- a plurality of cartridge storing compartments each having a space for storing any one of a first type record medium cartridge of a first size and a second record medium cartridge of a second size which is different from said first size, said compartments being constructed by first and second side plates, a rear plate and supporting side flanges connected to said first and second side plates, respectively; and

- a plurality of hook spring units, each being connected to the first side plate of respective compartments; wherein said hook spring unit comprises

- an arm member for resiliently urging a record medium cartridge inserted into a compartment against the second side plate;

- a first projection formed on the arm member to have a round outer configuration and being urged against a side wall of one of the cartridges and being engaged with a retaining step formed in a side wall of the other cartridge; and

- a second projection formed on said arm member to have a round outer configuration and being engaged with a retaining step formed in the side wall of the one cartridge and being urged against the side wall of the other cartridge.

In a preferable embodiment of the record medium cartridge storing box according to the invention, when a 3480 tape cartridge has been fully inserted into a compartment, said first projection is engaged with a retaining step formed in a side wall of the cartridge at a vicinity of a front end portion thereof and said second projection is urged against the side wall of the cartridge at a vicinity of a rear end portion thereof, and when a DLT tape cartridge has been fully inserted into a compartment, said first projection is urged against a side wall of the cartridge at a vicinity of a front end portion thereof and said second projection is engaged with a retaining step formed in the side wall of the cartridge at a vicinity of a rear end portion. In this manner, the 3480 cartridge and DLT cartridge can be firmly retained in the compartment and could not be accidentally removed from the compartment although the centrifugal force is applied to the cartridge due the rotation of the cartridge supporting box. Moreover, since the first and second projections are formed to have a round outer surface viewed in a direction parallel with the side wall of the cartridge, the cartridge can be easily removed from the compartment.

DESCRIPTION OF THE PREFERRED EMBODIMENTS

Now the present invention will be explained in detail with reference to the accompanying drawings.

Figure 1:
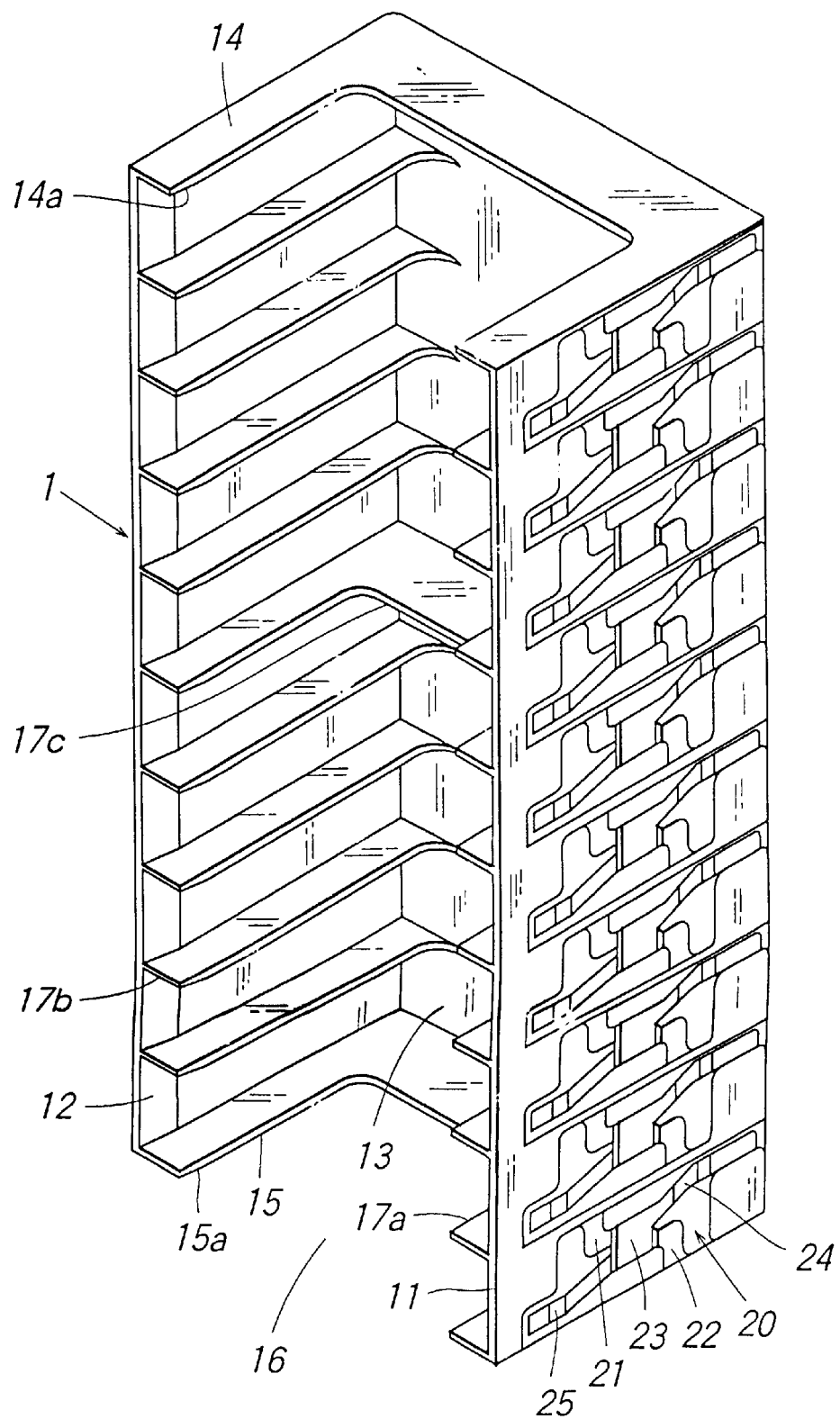
FIG. 1 is a perspective view showing an embodiment of the cartridge storing box according to the invention.
Figure 2:
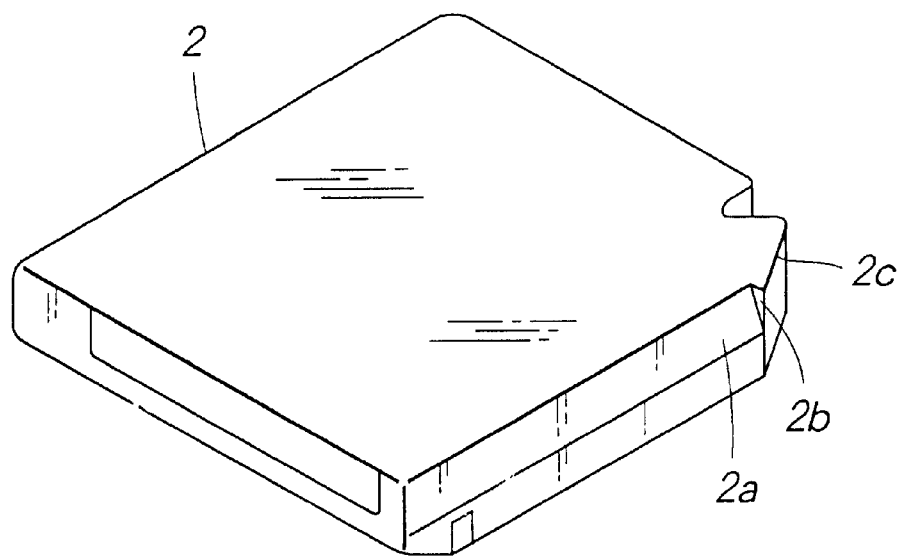
FIG. 2 is a perspective view illustrating a 3480 tape cartridge.
Figure 3:
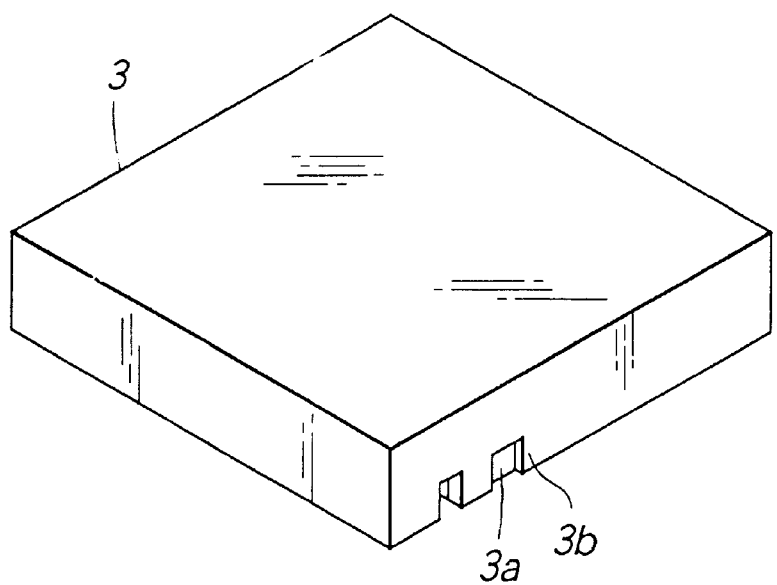
FIG. 3 is a perspective view depicting a DLT tape cartridge.

FIG. 1 is a perspective view showing an embodiment of the cartridge storing box according to the invention. In the present embodiment, a cartridge storing box 1 is constructed to store a 3480 tape cartridge 2 shown in FIG. 2 and a DLT cartridge 3 illustrated in FIG. 3. The 3480 tape cartridge 2 has a larger length and a larger width than the DLT cartridge 3. The 3480 tape cartridge 2 has a retaining step or notch 2b formed in a side wall of the cartridge in a vicinity of a front end portion thereof. The DLT tape cartridge has a retaining step 3b formed in a side wall of the cartridge in a vicinity of a rear end portion thereof. The cartridge storing box 1 comprises left hand (first) side plate 11, right hand (second) side plate 12, rear plate 13, top plate 14 and bottom plate 15. All of these plates are made of synthetic resin and are constructed to form an opening 16 opposing to the rear plate 13. The opening 16 has a width which is slightly larger than a width of 3480 cartridge 2. The right and left hand side plates 11 and 12 have a length which is slightly smaller than a length of the DLT tape cartridge 3. The top plate 14 and bottom plate 15 have formed therein relatively large recesses 14a and 15a, respectively.

Figure 5:
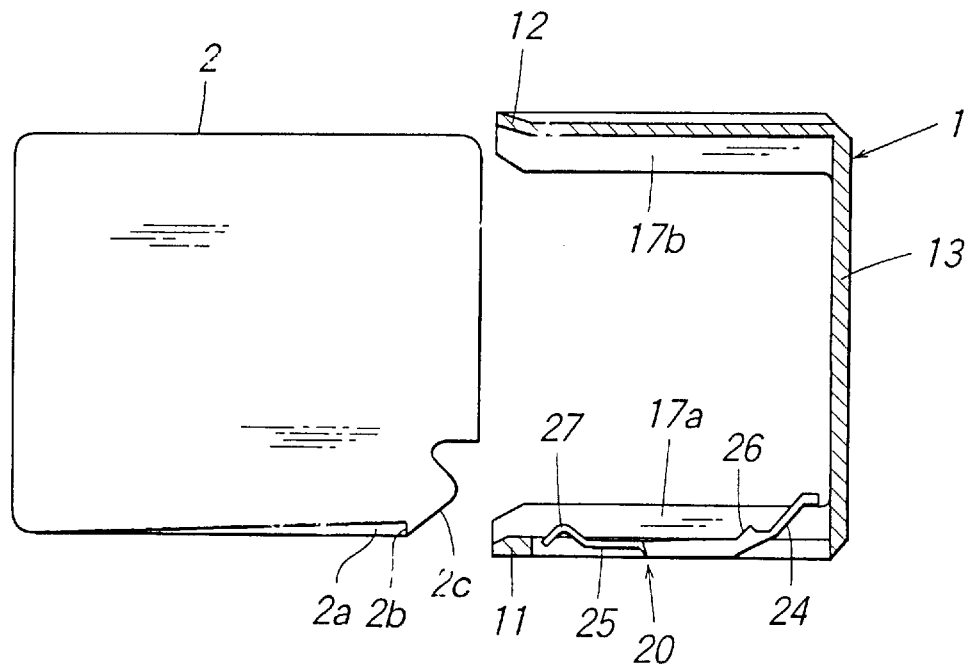
FIGS. 5, 6 and 7 are cross sectional views depicting a manner of inserting the 3480 tape cartridge into the cartridge storing box.
Figure 6:
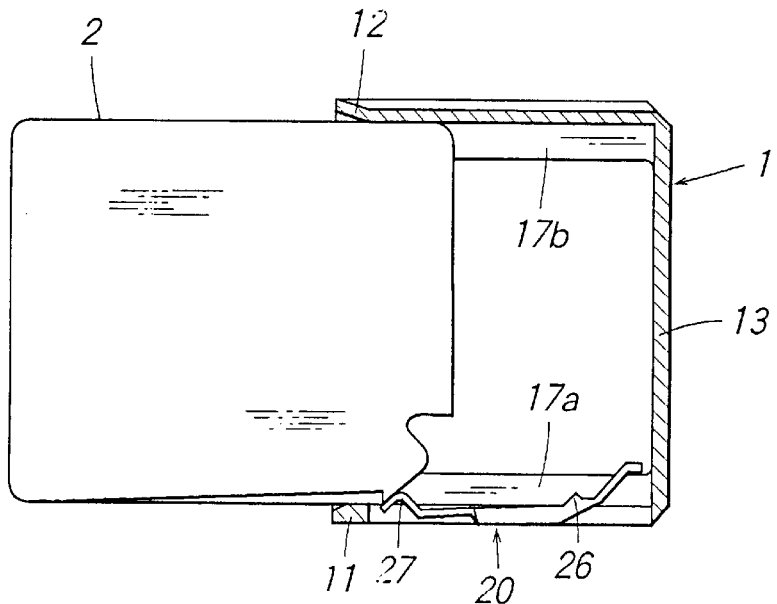

Between the top and bottom plates 14 and 15, there are provided a plurality of supporting side flanges 17a and 17b connected to inner surfaces of the left and right hand side plates 11 and 12, respectively at corresponding positions. In the present embodiment, nine supporting side flanges 17a and 17b are provided to constitute ten compartments each of which can store a 3480 tape cartridge 2 or a DLT tape cartridge 3, said compartments being arranged one on the other. Middle supporting side flanges 17a and 17b are coupled with each other by means of a bridging side flange 17c such that the side flanges 17a, 17b and 17c constitute an integral body having the same configuration as the top and bottom plates 14 and 15. The supporting side flanges 17a and 17b, the left hand (first) side plate 11, the right hand (second) side plate 12, and rear plate 13 can be formed as an integrally molded body of synthetic resin, as shown in FIG. 5.

In each of the compartments, there is provided a hook spring unit 20 secured to the inner surface of the left hand side plate 11 at such a position that a side wall of a 3480 tape cartridge 2 or DLT tape cartridge 3 is resiliently pushed by the hook spring unit.

Figure 4:
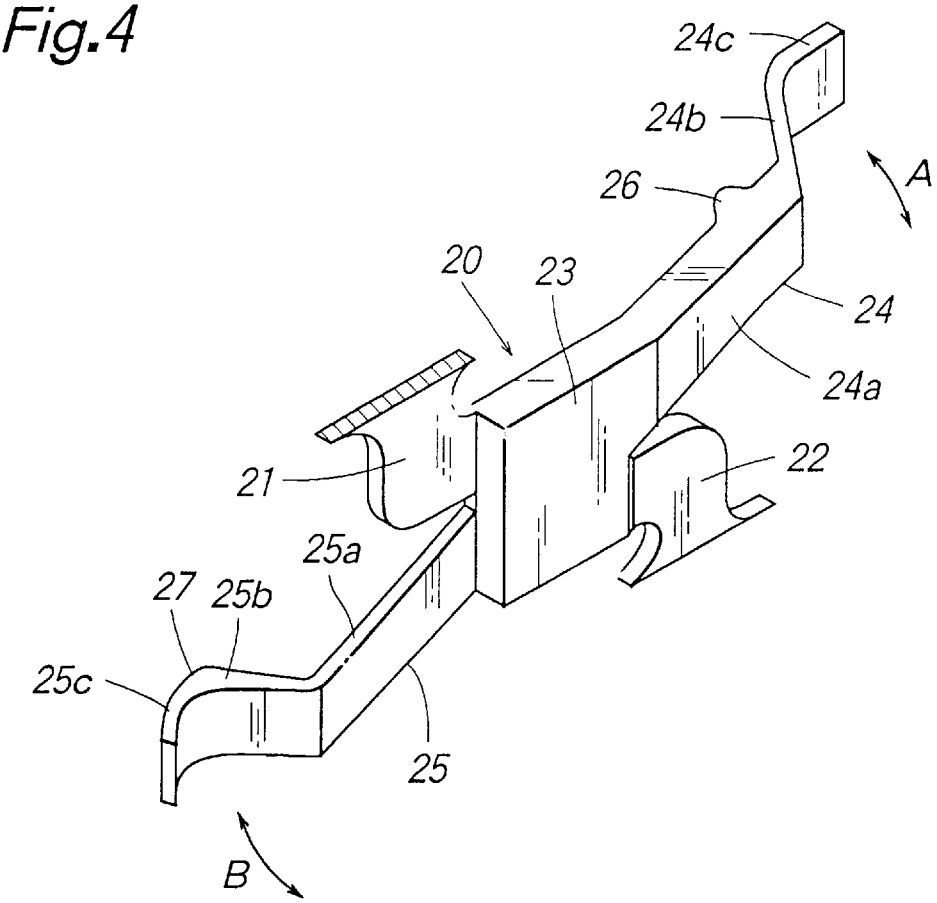
FIG. 4 is an enlarged perspective view showing a hook spring unit of the cartridge storing box according to the invention.

FIG. 4 shows the hook spring unit 20 of the present embodiment. The hook spring unit 20 can be formed as an integrally molded body of synthetic resin, as shown in FIG. 4, and comprises a middle portion 23 which is integrally coupled with the left hand side plate 11 by means of upper and lower hinges 21 and 22. From the middle portion 23, forward arm 24 and backward arm 25 are extended in forward and backward directions, respectively. The forward and backward arms 24 and 25 can be resiliently bent on a horizontal plane as illustrated double-headed arrows A and B, respectively. The forward arm 24 includes a first arm portion 24a which is slightly bent inwardly, a second arm portion 24b which is further bent inwardly, and a third arm portion 24c which is bent outwardly. On an inner surface of the first arm portion 24a, there is formed a first projection 26 which is inserted into a groove 2a formed on the side wall of the 3480 tape cartridge 2 and is engaged with the retaining step 2b formed on the same side wall of the 3480 tape cartridge 2 when the 3480 tape cartridge is inserted into the cartridge storing box as will be explained later.

The backward portion 25 comprises a fourth arm portion 25a which is slightly bent inwardly, a fifth arm portion 25b which is bent inwardly and a sixth arm portion 25c which is bent inwardly. On an inner surface of a connecting portion between the fifth arm portion 25b and the sixth arm portion 25c, there is formed a second projection 27 which is inserted into a recess 3a formed in a side wall of a DLT tape cartridge 3 and is engaged with the retaining step 3b formed at a front side edge of the recess 3a. In a free condition of the hook spring unit 20, a tip of the first projection 26 is positioned outwardly relative to a tip of the second projection 27.

Figure 7:
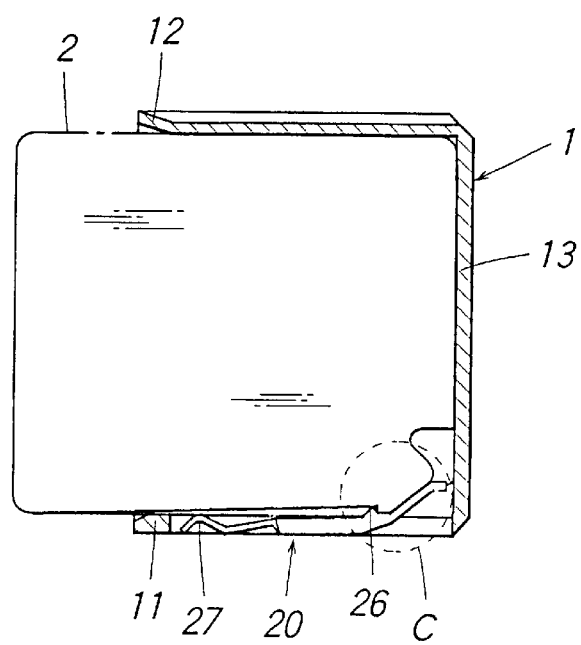
Figure 8:
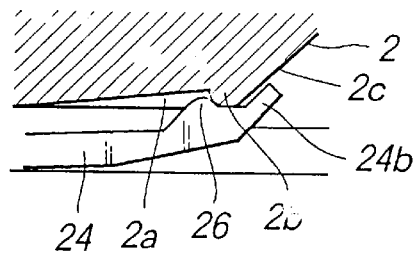
FIG. 8 is an enlarged cross sectional view of a portion C in FIG. 7.
Figure 9:
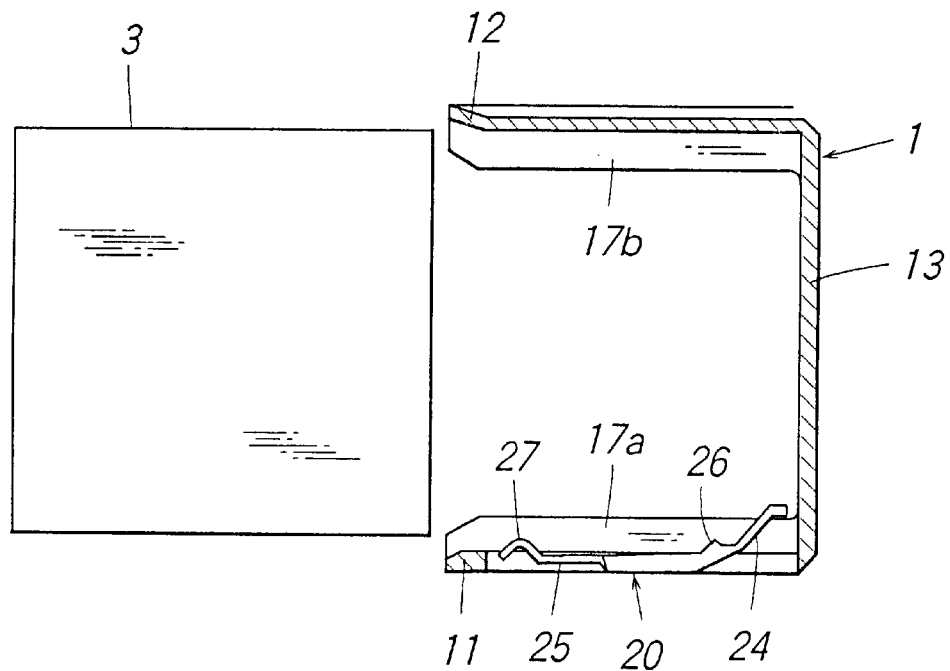
FIGS. 9, 10 and 11 are cross sectional views showing a manner of inserting the DLT tape cartridge into the cartridge storing box according to the invention.
Figure 10:
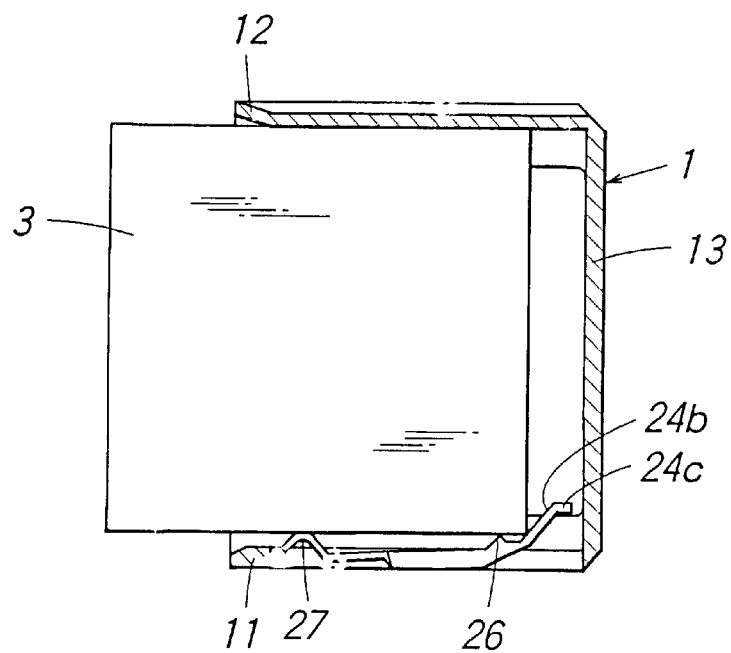

Now the operation of inserting a 3480 tape cartridge 2 having a larger size into the cartridge storing box 1 will be explained with reference to FIGS. 5–8. At first, a front portion of the 3480 tape cartridge 2 is inserted into a compartment formed by the side plates 11, 12, rear plate 13 and supporting side flanges 17a, 17b. It should be noted that the lowermost compartment is formed by the bottom plate 15 instead of the supporting side flanges 17a, 17b. At first, the second projection 27 is brought into contact with an inclined portion 2c formed at a front corner of the 3480 tape cartridge 2, and then the backward arm portion 25 is resiliently bent outwardly. Due to the restoring force of the backward arm portion 25, the 3480 tape cartridge 2 is urged against the right hand side plate 12. When the 3480 tape cartridge 2 has been inserted into the compartment until a front face of the cartridge is brought into contact with the rear plate 13 as depicted in FIG. 7. In this condition, the first projection 26 of the forward arm portion 24 is inserted into the groove 2a formed in the side wall of the 3480 tape cartridge 2 and the first projection 26 is engaged with the retaining step 2b. In this manner, the 3480 tape cartridge 2 can be easily and positively inserted into the compartment of the cartridge storing box 1.

Figure 11:
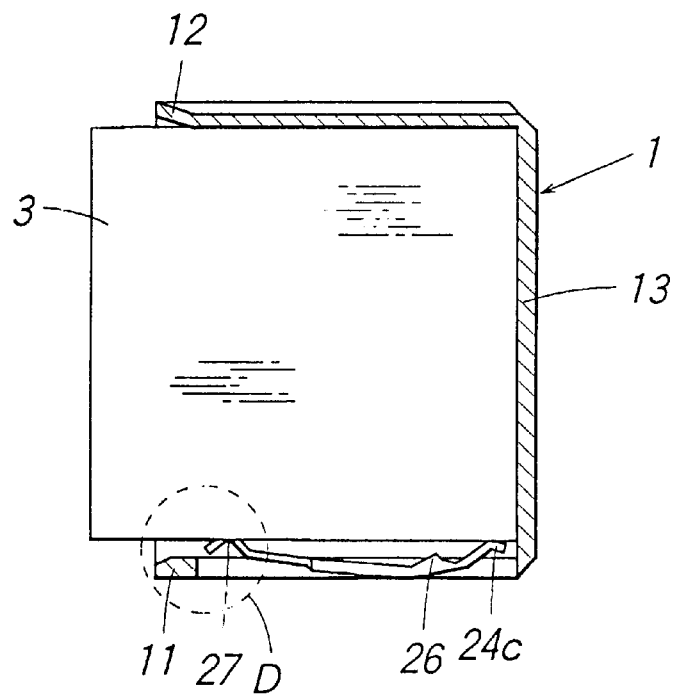
Figure 12:
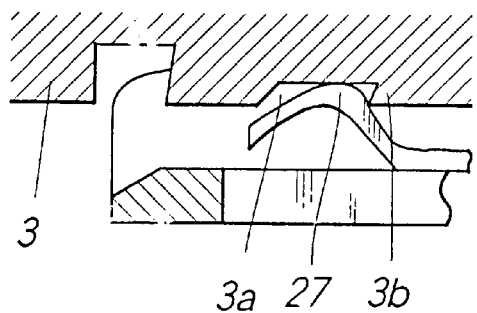
FIG. 12 is an enlarged cross sectional view of a portion D in FIG. 11.

FIGS. 9–12 show the operation of inserting a DLT tape cartridge 3 having a smaller size into the cartridge storing box 1. At first, the second projection 27 is brought into contact with the side wall of the DLT tape cartridge 3, and the DLT tape cartridge 3 is resiliently urged against the side plate 12 of the cartridge storing box 1. When the DLT tape cartridge 3 is fully inserted into the compartment as shown in FIG. 11, the second and third arm portions 24b and 24c are brought into contact with the side wall of the DLT tape cartridge 3. Therefore, the second and third arm portions 24b and 24c are resiliently bent outwardly and the front portion of the DLT tape cartridge 3 is resiliently urged against the side plate 12 of the cartridge storing box 1. Then, as depicted in FIG. 12, the second projection 27 is inserted into the recess 3a formed in the side wall of the DLT tape cartridge 3 and is engaged with the retaining step 3b. In this manner, the DLT tape cartridge 3 can be firmly retained in the compartment of the cartridge storing box 1.

When the 3480 tape cartridge 2 or DLT tape cartridge 3 stored in the cartridge storing box 1 is pulled by means of any suitable member out of the box, the first projection 26 or second projection can be easily disengaged from the retaining step 2b or retaining step 3b of the cartridge 2 or cartridge 3, because these projections 26 and 27 are shaped to have a round outer configuration.

As explained above, in the cartridge storing box 1 of the present embodiment, any of the 3480 tape cartridge 2 and DLT tape cartridge 3 having different sizes can be stored in the same compartment of the cartridge storing box. When the tape cartridge 2 or 3 has been fully inserted into the compartment of the cartridge storing box 1, the cartridge is firmly urged against the side plate 12 at both the front and rear portions by means of the front and rear arms 24 and 25 of the hook spring unit 20, respectively, and at the same time one of the first and second projections 26 and 27 is engaged with one of the retaining steps 2b and 3b. Therefore, the tape cartridge 2 or 3 could not be accidentally removed from the cartridge storing box 1 although the cartridge is subjected to the centrifugal force generated by the rotation of the cartridge storing box. Furthermore, the 3480 tape cartridge 2 and DLT tape cartridge 3 having different sizes can be inserted into any vacant compartment of the cartridge storing box 1, it is no more necessary to add a new cartridge storing box or to change a division within the cartridge storing box. Therefore, the cartridge storing box according to the invention can save a space and a cost.

It should be noted that the above explained cartridge storing box is constructed to store the 3480 tape cartridge and DLT tape cartridge, but according to the invention, the cartridge storing box may be formed to store a CD or CD-R disk cartridge and an MO disk cartridge.

As explained above in detail, in the cartridge storing box according to the invention, record medium cartridges having different sizes can be removably stored in the same compartment of the cartridge storing box by providing the hook spring unit which includes the first arm portion having the first projection with the round outer configuration and the second arm portion having the second projection with the round outer configuration, said first projection being engaged with the retaining step formed in one of the cartridges or being urged against the side wall of the other cartridge and said second projection being urged against the side wall of the other cartridge and being engaged with the retaining step formed in the side wall of the one cartridge. Therefore, the inserted cartridge can be positively retained in the compartment of the cartridge storing box, and at the same time the stored cartridge can be easily removed out of the cartridge storing box, because the first and second projections have the round configuration.

What is claimed is:

1. A cartridge storing box comprising:
    a plurality of compartments each having an opening for storing one of a plurality of record medium cartridges; said record medium cartridges including a first sized cartridge of a first size and a second sized cartridge of a second size which is different from said first size, said first and second sized cartridges having a side wall with a flat portion and a retaining notch,
    said compartments being constructed respectively by a first side plate, a second side plate, a rear plate, supporting side flanges connected to said first and second side plates, and a hook spring unit connected to said first side plate; said hook spring units respectively including an arm member, a first projection and a second projection formed on said arm member, said first and second projections having a rounded projection, said compartments receiving and holding either of said first sized cartridge or said second sized cartridge;
    wherein said first projection of said arm member of said compartments resiliently urges said first sized cartridge inserted into one of said compartments against said second side plate of said compartments by pushing against said flat portion of said side wall of said first sized cartridge, and said first projection of said arm member of said compartments is retained in said retaining slot of said side wall of said second sized cartridge when said second sized cartridge is inserted into one of said compartments, and
    wherein said second projection of said arm member of said compartments resiliently urges said second sized cartridge inserted into one of said compartments against said second side plate of said compartments by pushing against said flat portion of said side wall of said second sized cartridge, and said second projection of said arm member of said compartments is retained in said retaining slot of said side wall of said first sized cartridge when said first sized cartridge is inserted into one of said compartments.

2. A cartridge storing box according to claim 1, wherein said arm member of a respective said compartment comprises a hinge portion which is secured to said first side plate, a forward arm portion having one end secured to said hinge portion and another end at which said first projection is formed, and a rearward arm portion having one end secured to said hinge portion and another end at which said second projection is formed.

3. A cartridge storing box according to claim 1, wherein said first projections are formed to be engaged with a retaining notch formed in a side wall of a 3480 tape cartridge and said second projections are formed to be engaged with a retaining step formed in a side wall of a DLT tape cartridge.

4. A cartridge storing box according to claim 1, wherein said hook spring units are each formed as an integrally molded body of synthetic resin.

5. A cartridge storing box according to claim 1, wherein said first and second side plates, rear plate and supporting side latches are formed as an integrally molded body of synthetic resin.

6. A record medium cartridge storing box for removably storing a first sized cartridge and a second sized cartridge; said first sized cartridge having a side wall, a front end portion, and a retaining notch formed in said side wall in a vicinity of said front end portion; said second sized cartridge having a side wall, a rear end portion, and a retaining notch formed in said side wall in a vicinity of said rear end portion; and said second sized cartridge having a size which is smaller than that of said first sized cartridge;
    a plurality of compartments arranged one on another, each of said compartments being constructed by first and second side plates, a rear plate and first and second supporting side flanges secured to said first and second side plates, respectively; and
    a plurality of hook spring units, each being connected to said first side plate of respective compartments; each of said hook spring unit including hinge portions connected to said first side plate, a middle portion connected to said hinge portions, a forward arm extending from said middle portion in a forward direction, a backward arm extending from said middle portion in a backward direction, a first projection formed at a free end portion of said forward arm and having a round outer configuration, and a second projection formed at a free end portion of said backward arm and having a round outer configuration;

wherein said first and second projections of each said compartment are formed at such positions that when said first sized cartridge has been fully inserted into a respective said compartment, said first projection thereof is engaged with said retaining notch and said second projection thereof is urged against said side wall of said first sized cartridge; and when said second sized cartridge has been fully inserted into a respective said compartment, said second projection thereof is engaged with said retaining notch and said first projection thereof is urged against said side wall of said second sized cartridge.

7. A record medium cartridge storing box according to claim 6, wherein said forward arms respectively include a first arm portion which is slightly bent inwardly, a second arm portion which is further bent inwardly and a third arm portion which is bent outwardly; said first projections respectively being formed on an inner surface of said first arm portions; and said backward arms respectively include fourth arm portions which are slightly bent inwardly, fifth arm portions which are bent inwardly and sixth arm portions which are bent inwardly; and said second projections are formed on an inner surface of a connecting portion between a respective said the fifth arm portion and a respective said sixth arm portion.

* * * * *